US006842419B2

United States Patent
Nakamura et al.

(10) Patent No.: US 6,842,419 B2
(45) Date of Patent: Jan. 11, 2005

(54) OPTICAL INFORMATION RECORDING MEDIUM AND OPTICAL DISK DRIVE

(75) Inventors: Naomasa Nakamura, Yokohama (JP); Sumio Ashida, Tokyo (JP); Keiichiro Yusu, Yokohama (JP); Katsutaro Ichihara, Yokohama (JP); Noritake Oomachi, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 496 days.

(21) Appl. No.: 10/102,807

(22) Filed: Mar. 22, 2002

(65) Prior Publication Data

US 2003/0107976 A1 Jun. 12, 2003

(30) Foreign Application Priority Data

Dec. 7, 2001 (JP) ........................................ 2001-374657

(51) Int. Cl.⁷ .................................................. G11B 7/00
(52) U.S. Cl. ...................... 369/100; 369/275.1; 369/284
(58) Field of Search ....................... 369/9.4, 100, 275.1, 369/275.2, 275.5, 283, 284, 288

(56) References Cited

U.S. PATENT DOCUMENTS 6,240,060 B1   5/2001   Kikitsu et al.

6,751,184 B2 * 6/2004 Kojima et al. ........... 369/275.2

FOREIGN PATENT DOCUMENTS

| JP | 2000-322770 | 11/2000 |
| JP | 2001-243655 | 9/2001 |
| JP | 2002-230828 | 8/2002 |

OTHER PUBLICATIONS

Akiyama, et al., "Rewritable Dual–Layer Phase–Change Optical Disk Utilizing Blue–Violet Laser", Optical Disk Systems Development Center, pp. 16–17.

Japanese Patent Office Action dated Mar. 2, 2004.

* cited by examiner

*Primary Examiner*—Paul W. Huber
(74) *Attorney, Agent, or Firm*—Pillsbury Winthrop LLP

(57) ABSTRACT

An optical information recording medium includes a substrate, first information recording layer, and second information recording layer. The first information recording layer includes a recording film, first dielectric film whose complex index has a real part n1, second dielectric film whose complex index has a real part n2, and third dielectric film whose complex index has a real part n3. Relationships n1>n2 and n3>n2 are satisfied.

6 Claims, 6 Drawing Sheets

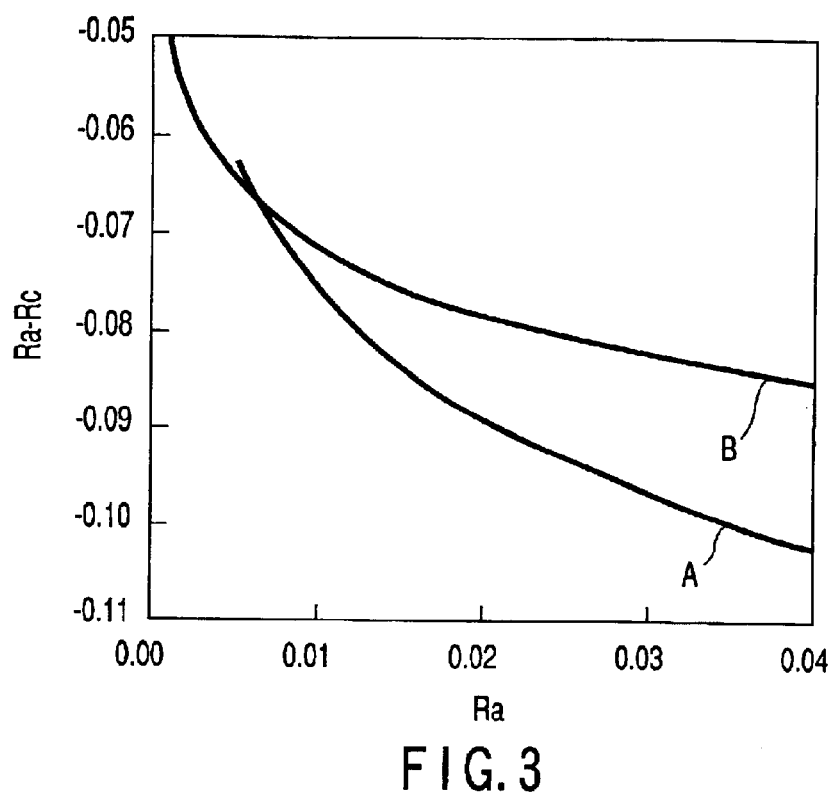
F I G. 3
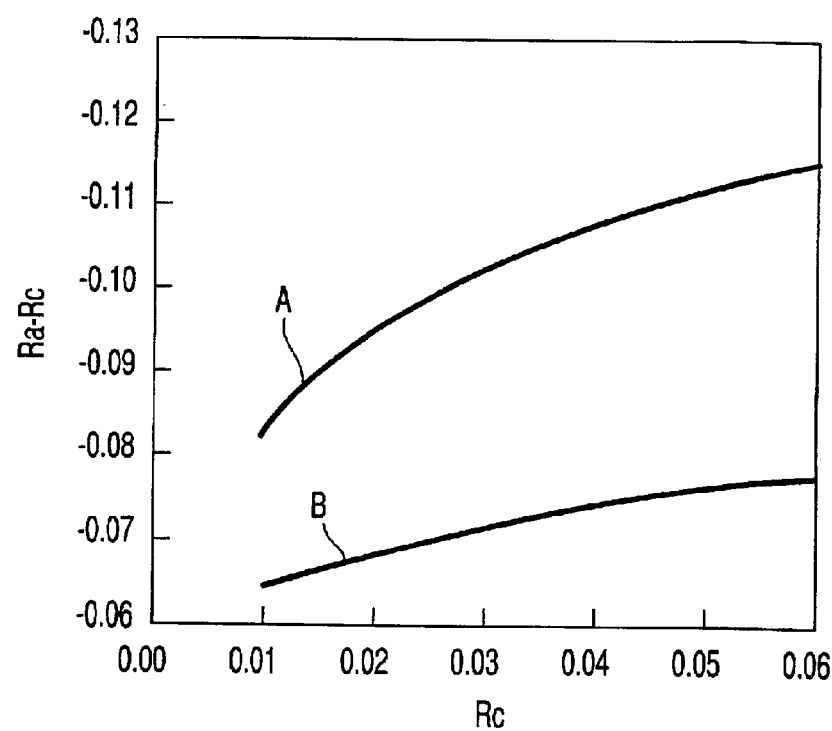
F I G. 4

| | |
|---|---|
| ZnS:SiO2 | 50 |
| GeN | 5 |
| GeSbTe | 7 |
| GeN | 5 |
| ZnS:SiO2 | 10 |
| BaF2 | 20 |
| ZnS:SiO2 | 30 |
| Rc | 11.3% |
| Ra | 2.4% |
| Ra-Rc | -8.9% |
| Transmittance | 50.5% |
| Linear velocity | 5.0m/s |
| CNR | 57dB |

F I G. 5

| | |
|---|---|
| ZnS:SiO2 | 110 |
| GeN | 5 |
| GeSbTe | 6 |
| GeN | 5 |
| ZnS:SiO2 | 10 |
| SiO2 | 100 |
| ZnS:SiO2 | 20 |
| Rc | 5.5% |
| Ra | 15.1% |
| Ra-Rc | 9.5% |
| Transmittance | 50.2% |
| Linear velocity | 8.0m/s |
| CNR | 57dB |

F I G. 7

| | Optical constant | | Thermal conductivity |
|---|---|---|---|
| | n | k | (W/m-k) |
| ZnS:SiO2 | 2.33 | 0 | 0.55 |
| BaF2 | 1.48 | 0 | 6.8 |

F I G. 6

| | Optical constant | | Thermal conductivity |
|---|---|---|---|
| | n | k | (W/m-k) |
| ZnS:SiO2 | 2.33 | 0 | 0.55 |
| SiO2 | 1.47 | 0 | 1.1 |

F I G. 8

| | |
|---|---|
| ZnS:SiO2 | 60 |
| GeN | 5 |
| GeSbTe | 6 |
| GeN | 5 |
| ZnS:SiO2 | 10 |
| Ag alloy | 5 |
| | |
| Rc | 8.3% |
| Ra | 1.6% |
| Ra-Rc | -6.7% |
| Transmittance | 50.6% |
| Liner velocity | 5.0~12.0 |
| Maximum CNR | 52dB |
F I G. 9
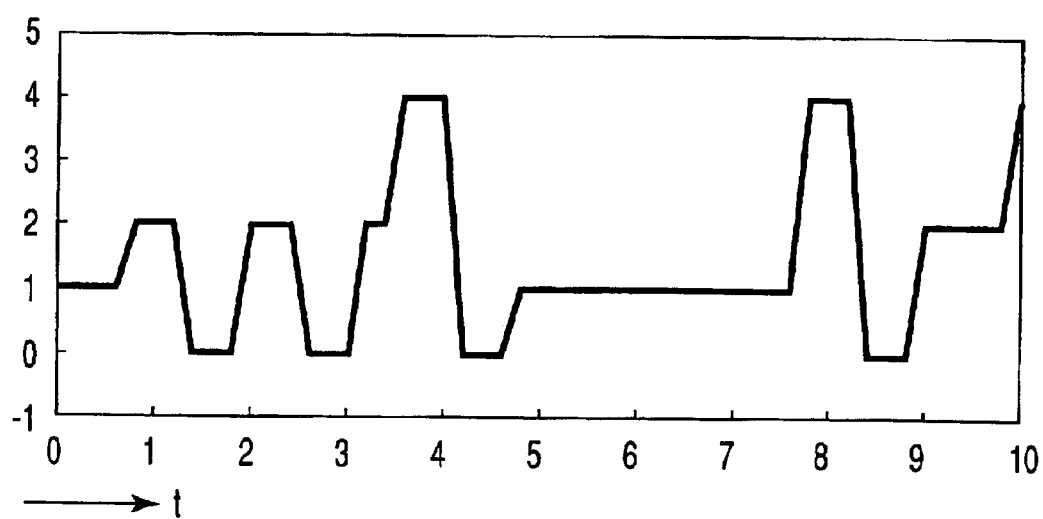
F I G. 10

OPTICAL INFORMATION RECORDING MEDIUM AND OPTICAL DISK DRIVE

CROSS-REFERENCE TO RELATED APPLICATIONS

This application is based upon and claims the benefit of priority from the prior Japanese Patent Application No. 2001-374657, filed Dec. 7, 2001, the entire contents of which are incorporated herein by reference.

BACKGROUND OF THE INVENTION

1. Field of the Invention

The present invention relates to a phase change optical information recording medium capable of recording/reproducing information upon receiving light beam irradiation and, more particularly, to an optical information recording medium having two or more information recording layers accessible from one surface. The present invention also relates to an optical disk drive for irradiating the above optical information recording medium with a light beam to record information.

2. Description of the Related Art

A phase change optical recording medium capable of recording/reproducing information upon receiving light beam irradiation has been put into practical use as a storage medium having advantages such as a large capacity, high-speed access, and good portability. Its application purposes are expected to expand in future by increasing density.

Optical recording media are classified into a single-sided, single-layered type and a single-sided, n-layered type (n≧2). A single-sided, single-layered optical recording medium has only one recording layer accessible from one surface of the optical recording medium. That is, the single-sided, single-layered optical recording medium can record information on the single recording layer, erase information recorded on the recording layer, or reproduce information recorded on the recording layer by a light beam incident from one surface of the optical recording medium. To the contrary, a single-sided, n-layered optical recording medium has n recording layers accessible for one surface of the optical recording medium. That is, the single-sided, n-layered optical recording medium can record information on the n recording layers, erase information recorded on the n recording layers, or reproduce information recorded on the n recording layers by a light beam incident from one surface of the optical recording medium. The single-sided, n-layered optical recording medium can hold an information amount about n times that of the single-sided, single-layered optical recording medium.

For example, Jpn. Pat. Appln. KOKAI Publication No. 2000-322770 discloses a technique related to a single-sided, n-layered optical recording medium.

A single-sided, two-layered optical recording medium has a first information layer and a second information layer sequentially from a side close to the light incident surface. The first information layer has a recording film and a dielectric protective film in contact with it sequentially from the side close to the light incident surface. Similarly, the second information layer has a recording film and a dielectric protective film in contact with it sequentially from the side close to the first information layer.

To record information on the second information layer, a laser power capable of melting the recording film of the second information layer is necessary. Hence, the transmittance of the first information layer must be designed to be relatively high. More specifically, it must be designed such that 50% or more of the laser power can reach the recording film of the second information layer.

A technique disclosed in ISOM (International Symp. on Optical Memory) 2000, Tech. Digest We-C-01 describes the structure of a first information layer. A transparent protective layer, interface layer, recording layer, interface layer, transparent protective layer, and metal reflecting layer are formed sequentially from the light incident side. The metal reflecting layer has an effect for causing the first information layer to have an appropriate reflectance value. However, it also absorbs light. For this reason, the optical power received by the second information layer decreases as compared to a case wherein no metal reflecting layer is formed.

In a phase change optical recording medium, information is recorded upon receiving light beam irradiation on a recording film. More specifically, when the recording film is irradiated with a light beam, the state of the recording film transits between a crystal state and an amorphous state to record information. The reflectance in a region in the crystal state is different from that in a region in the amorphous state. By detecting the difference, recorded information is read out.

By appropriately designing the dielectric film thicknesses on and above the recording film, the reflectance in the amorphous state is made higher than that in the crystal state, or the reflectance in the crystal state is made higher than that in the amorphous state. In the former case, the amorphous state corresponds to a high-level signal, and the crystal state corresponds to a low-level signal. Information is read out by making the high and low levels correspond to binary values and modulating the reflectance.

The first information layer preferably has a reflectance satisfying the following conditions. In a so-called High-to-Low case wherein a reflectance Ra in the amorphous state is lower than a reflectance Rc in the crystal state, the design is done such that Rc−Ra becomes as large as possible and Ra becomes as low as possible. The former condition is necessary to obtain a high reproduction signal intensity. The latter condition is necessary to reduce noise in the reproduction mode. In a so-called Low-to-High case wherein the reflectance Rc in the crystal state is lower than the reflectance Ra in the amorphous state, the design is done such that Ra−Rc becomes as large as possible and Rc becomes as low as possible. The effects of the respective conditions are the same as described above. That is, it is important to design such that the reflectance difference between the crystal state and the amorphous state becomes as large as possible, and the reflectance in the state corresponding to low level becomes as low as possible.

In designing the first information layer of the single-sided, two-layered optical recording medium, to meet the requirement to increase the transmittance, the degree of freedom of the reflectance Rc in the crystal state and the reflectance Ra in the amorphous state is considerably limited. For example, in Low-to-High, when a transmittance of 50% and Ra<4% are to be satisfied, Rc−Ra cannot be 8.5% or more. In High-to-Low, when Rc<4% is to be satisfied, Ra−Rc cannot be 7.5% or more. For this reason, the quality of a reproduction signal is low. Especially, it is difficult to reduce the error rate in high-density recording.

Particularly, when the interval between high and low levels is divided into multilevel values to execute multilevel recording, it is especially important that the interval between the high and low levels be sufficiently large, i.e., the reflectance difference between the crystal and amorphous-states be large. In the prior art, however, single-sided, two-layered recording and multilevel recording cannot be combined.

BRIEF SUMMARY OF THE INVENTION

It is an object of the present invention to provide a single-sided, n-layered optical information recording medium suitable for high-density recording.

(1) An optical information recording medium capable of recording/reproducing information upon being irradiated with a light beam, comprising a substrate, a light incident surface, a first information recording layer formed between the substrate and the light incident surface to transit between a crystal state and an amorphous state upon being irradiated with the light beam, and a second information recording layer formed between the substrate and the first information recording layer to transit between the crystal state and the amorphous state upon being irradiated with the light beam, wherein the first information recording layer comprises sequentially from a side of the light incident surface to a side of the substrate, a recording film, a first dielectric film whose complex index has a real part n1, a second dielectric film whose complex index has a real part n2, and a third dielectric film whose complex index has a real part n3, and relationships n1>n2 and n3>n2 are satisfied.

(2) An optical disk drive for irradiating an optical information recording medium with a light beam to record/reproduce information, comprising irradiation section configured to irradiating the optical information recording medium with the light beam, and recording section configured to controlling at least one of an irradiation timing and irradiation power of the light beam by the irradiation section to record multilevel information, wherein the optical information recording medium comprises a substrate, a light incident surface, a first information recording layer formed between the substrate and the light incident surface to transit between a crystal state and an amorphous state upon being irradiated with the light beam, and a second information recording layer formed between the substrate and the first information recording layer to transit between the crystal state and the amorphous state upon being irradiated with the light beam, the first information recording layer comprises sequentially from a side of the light incident surface to a side of the substrate, a recording film, a first dielectric film whose complex index has a real part n1, a second dielectric film whose complex index has a real part n2, and a third dielectric film whose complex index has a real part n3, and relationships n1>n2 and n3>n2 are satisfied.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

FIG. 3 is a graph showing a reflectance characteristic when the optical information recording medium according to the embodiment of the present invention is designed to have a High-to-Low polarity (a reflectance Ra in the amorphous state is lower than a reflectance Rc in the crystal state);

FIG. 4 is a graph showing a reflectance characteristic when the optical information recording medium according to the embodiment of the present invention is designed to have a Low-to-High polarity (the reflectance Rc in the crystal state is lower than the reflectance Ra in the amorphous state);

FIG. 5 is a table showing the film structure (Example 1) of the optical information recording medium according to the embodiment of the present invention;

FIG. 6 is a table showing an evaluation result of the film structure (Example 1) of the optical information recording medium according to the embodiment of the present invention;

FIG. 7 is a table showing the film structure (Example 2) of the optical information recording medium according to the embodiment of the present invention;

FIG. 8 is a table showing an evaluation result of the film structure (Example 2) of the optical information recording medium according to the embodiment of the present invention;

FIG. 9 is a table showing the layer structure of a control medium with the optical information recording medium of the present invention;

FIG. 10 is a graph showing a change-over-time in recording beam power in recording multilevel information on the optical information recording medium of the present invention;

DETAILED DESCRIPTION OF THE INVENTION

An embodiment of the present invention will be described below with reference to the accompanying drawing.

Figure 1:
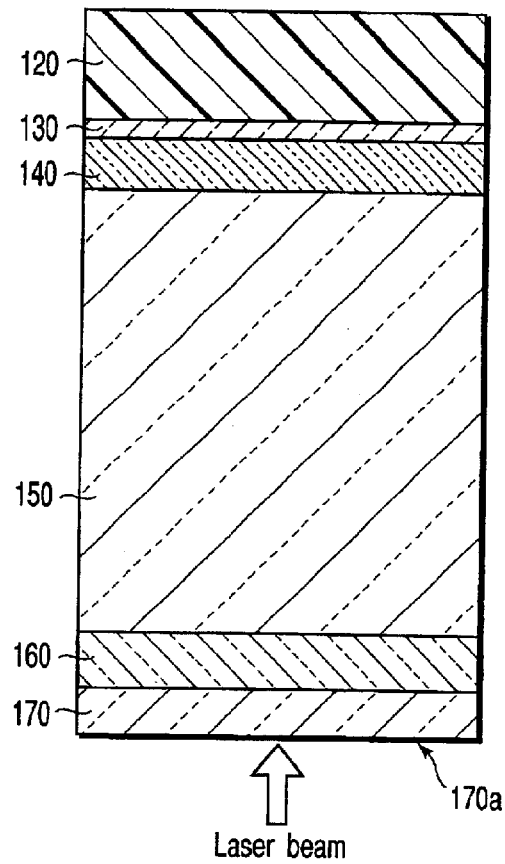
FIG. 1 is a sectional view showing the layer structure of an optical information recording medium according to an embodiment of the present invention.
Figure 2:
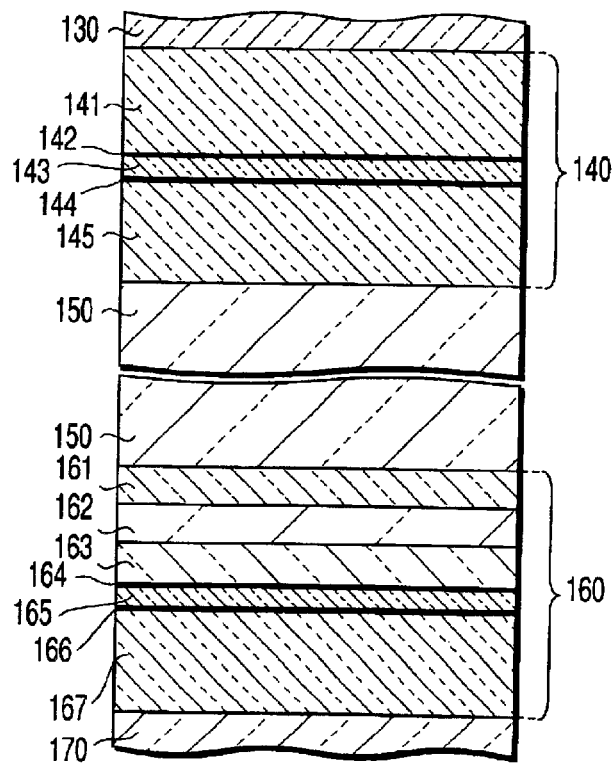
FIG. 2 is a sectional view showing the layer structure of the optical information recording medium according to the embodiment of the present invention in more detail.

FIG. 1 is a sectional view showing the layer structure of an optical information recording medium according to an embodiment of the present invention. FIG. 2 is a sectional view showing the layer structure of the optical information recording medium according to the embodiment of the present invention in more detail.

As shown in FIG. 1, the optical information recording medium ha a substrate 120, reflecting layer 130, second information layer 140, transparent separation layer 150, first information layer 160, and cover layer 170. For example, the reflecting layer 130 is about 100-nm thick, each of the second information layer 140 and first information layer 160 is about 150-nm thick, and the transparent separation layer 150 is about 20- to 30-μm thick. A light beam with which the first information layer 160 and second information layer 140 are irradiated becomes incident from a light incident surface 170a of the cover layer 170.

As shown in FIG. 2, the second information layer 140 has a transparent film 141, interface film 142, recording film 143, interface film 144, and transparent film 145. The first information layer 160 has a third transparent film (third dielectric film) 161, second transparent film (second dielectric film) 162, first transparent film (first dielectric film) 163, interface film 164, recording film 165, interface film 166, and transparent film 167.

FIGS. 1 and 2 show the layer structure of a single-sided, two-layered medium. Even a single-sided, n-layered medium has at least the first information layer 160 and second information layer 140. It is important to design the single-sided, two-layered medium such that a high-quality reproduction signal tan be obtained from these information layers.

Let Ra1 be the reflectance from the first information layer 160 when the recording film of the first information layer 160 is in an amorphous state. Let Rc1 be the reflectance from the first information layer 160 when the recording film of the first information layer 160 is in a crystal state. When the first information layer 160 is designed to have a Low-to-High polarity, it is preferable to first design Ra1−Rc1 as high as possible and then design Rc1 as low as possible. When the first information layer 160 is designed to have a High-to-Low polarity, it is preferable to first design Rc1−Ra1 as high as possible and then design Ra1 as low as possible. To ensure a sufficient amount of light beam to access the second information layer 140, the light transmittance across the first information layer 160 must be about 50% or more.

The following conditions are required to satisfy the above conditions. First, to obtain a light transmittance of 50% or more across the first information layer 160, the thickness of the recording film of the first information layer 160 must be set in an appropriate range. For example, when a GeSbTe-based recording film is used, or when an InSbTe-, AgInSbTe-, or AgInSbTe-based recording film is used, the recording film thickness is set to 8 nm or less. For the reflectance relationship between the crystal state and the amorphous state, a light-absorbing film can be effectively formed on the opposite side of the light incident surface 170a with respect to the recording film. Especially, when an optical constant is defined as n−ik, a film with small n and large k is effective. An example is disclosed in the above-described ISOM 2000, Tech. Digest We-C-01. In this example, a silver alloy is used.

However, first, when the recording film thickness is decreased, the reflectance difference between the amorphous state and the crystal state becomes small to reduce the reproduction signal intensity. In addition, since the crystallization speed decreases, the erase rate degrades.

Second, when a film with small n and large k is formed, light is absorbed, and the transmittance decreases. Hence, to ensure the transmittance, the recording film thickness must be further decreased.

As described above, when a light-absorbing film is used to improve the reproduction signal, the recording film thickness must be decreased more than necessary.

In this case, no required reflectance difference can be obtained. In addition, the erase rate degrades because of the decrease in crystallization speed.

The optical information recording medium according to the embodiment of the present invention has, in place of the light-absorbing film, a plurality of transparent films having different refractive indices, which can obtain a satisfactory reflectance relationship without reducing the transmittance. In other words, a plurality of transparent films 161, 162, and 163 having different refractive indices are stacked.

It is important that the optical constants of the plurality of transparent films 161, 162, and 163 having different refractive indices hold a specific relationship. The first transparent film 163, second transparent film 162, and third transparent film 161 are stacked sequentially from the light incident side. The complex index of the first transparent film 163 is defined as $n1-ik1$, the complex index of the second transparent film 162 is defined as $n2-ik2$, and the complex index of the third transparent film 161 is defined as $n3-ik3$. All k1, k2, and k3 are smaller than 0.06, and $n1>n2$ and $n3>n2$. A transparent film with a lower refractive index than n1 may be inserted between the first transparent film 163 and the recording film 165. This does not decrease the effect of the present invention.

As described above, the second transparent film 162 having a low refractive index is inserted between the first transparent film 163 and third transparent film 161 which have high refractive indices. The three transparent films 161, 162, and 163 having such a structure are effective. Transparent films having different refractive indices may be further stacked.

The effect of the present invention will be described in detail. Some components of light transmitted through the recording film 165 are reflected by the interface between the first transparent film 163 and the second transparent film 162 and by the interface between the second transparent film 162 and the third transparent film 161. Since the reflected light components interfere with each other, the total reflected light intensity increases or decreases depending on the thickness of each transparent film. The reflectance Rc when the recording film 165 is in the crystal state and the reflectance Ra when the recording film 165 is in the amorphous state are checked while changing the thicknesses of the transparent films 161, 162, and 163. Both the reflectances Rc and Ra take various values. A preferably reflectance for an application use is obtained when each film has a specific thickness. In design for the High-to-Low (Rc>Ra) polarity, when each transparent film is set to a specific thickness, Rc−Ra can be made high while suppressing Ra low. FIG. 3 shows this state. Referring to FIG. 3, a combination of Ra−Rc and Ra in a conventional medium corresponds to the region on the upper side of a curve B. For example, when Ra should be 0.03 or less, Ra−Rc cannot be set to −0.082 or less. That is, a reflectance difference ΔR cannot be 8.2% or more. On the other hand, in the medium of the present invention, the limit of Ra−Rc can be expanded to a curve A. That is, Ra−Rc can be reduced to −0.097 even for Ra≦0.03. That is, a reflectance difference of 9.7% can be obtained. For this reason, the signal intensity can be increased.

Similarly, in design for the Low-to-High (Rc<Ra) polarity, when each transparent film is set to a specific thickness, Ra−Rc can be made high while suppressing Rc low. FIG. 4 shows this state. Referring to FIG. 4, Ra−Rc in the conventional medium can take only a value under the curve B. However, Ra−Rc in the medium of the present invention can take a value under the curve A. For this reason, the signal intensity can be increased. In either case of Rc>Ra or Rc<Ra, n2 is preferably smaller than 1.55. In this case, a particularly large reflectance difference can be obtained.

In forming an amorphous recording mark, to realize a satisfactory mark shape while suppressing re-crystallization of a molten portion, an appropriate recording film cooling rate must be set. To do this, the thermal conductivities of the first transparent film 163 and second transparent film 162 are particularly important. Let a1 and a2 be the thermal conductivities of the first transparent film 163 and second transparent film 162, respectively. Then, it is found that preferably a1<a2 and, more particularly, a1<10*a2. This is because the recording film heated to the melting point or more can be efficiently cooled. Hence, when a specific material is used for each transparent film, optical enhancement and appropriate recording mark shape can be attained.

A dielectric film material can be appropriately selected from $TiO_2$, $SiO_2$, AlN, SiN, $Ta_2O_3$, MgO, CaO, SiC, ZnS, $CaF_2$, $MgF_2$, $Al_2O_3$, ZnO, $Ce_2O_3$, $Y_2O_3$, $Cr_2O_3$, $V_2O_5$, $ZrO_2$, $GeO_2$, $SnO_2$, ITO, BN, CN, C, and $In_2O_3$. For the first transparent film 163 and third transparent film 161, a material having a relatively high refractive index such as ZnS, $ZnS:SiO_2$, $TiO_2$, or SiN is preferable.

Example 1 of the optical information recording medium of the present invention will be described below.

FIG. 5 is a table showing the film structure of the two-layered phase change optical recording medium shown in FIGS. 1 and 2. FIG. 5 shows, sequentially from the upper side, the materials and thicknesses of the transparent film 167 on the light incident side, the interface film 166, the recording film 165, the interface film 164, the first transparent film 163, the second transparent film 162, and the third transparent film 161. Subsequently, the reflectance Rc when the recording film 165 is in the crystal state, the reflectance Ra when the recording film 165 is in the amorphous state, and Ra–Rc are shown. In addition, the average transmittance of a transmittance Ta when the recording film 165 is in the amorphous state and a transmittance Tc when the recording film 165 is in the crystal state is shown. As shown in FIG. 5, Rc>Ra, i.e., the medium had a so-called High-to-Low polarity. The interface film was made of a dielectric material but was as thin as 5 nm Example 1. For this reason, there was no influence of the presence of the interface film. The point of the present invention is the first transparent film 163, second transparent film 162, and third transparent film 161 which satisfy n1>n2 and n3>n2. A very thin film having a thickness of about 10 nm can be separated from the effect of the stacked dielectric layer independently of the refractive index or thermal conductivity of the interface film.

The procedure of manufacturing the medium will be described. First, a first information layer was formed in advance on a 1.1-mm thick polycarbonate (PC) substrate having grooves formed by injection molding. The structure was silver alloy/$ZnS:SiO_2$/GeN/GeSbTe/GeN/$ZnS:SiO_2$. The film thickness was set such that the reflectance of the single structure satisfied Ra=40% and Rc=20%. The recording film GeSbTe of a second information layer was crystallized by an initialization apparatus. Grooves were then formed in the first information layer. That is, the entire surface of the PC substrate was coated with a photo-setting resin to a thickness of 30 μm. A transparent glass plate in which grooves were formed in advance was brought into tight contact with the substrate. After the resin was cured by UV light irradiation, the transparent glass plate was separated to prepare a substrate used to form the first information layer. The substrate was inserted in a sputtering apparatus to sequentially form the films shown in FIG. 5. After all the films were formed, a 80-μm thick PC sheet was bonded to the substrate. The recording film was partially initialized by the initialization apparatus with a semiconductor laser beam having a wavelength of 810 nm, a width of 100 μm, and a length of 1 μm, thus completing the medium.

The reflectance of the initialized portion of the medium and that of the uninitialized portion were measured. The result shown in FIG. 5 was obtained. Although the transmittance was 50% or more, a low reflectance Ra of 2.4% and a large reflectance difference ΔR=|Rc–Ra|=8.9% were simultaneously obtained. The transmittance shown in FIG. 5 is the average transmittance of the crystal and amorphous portions.

The medium was evaluated using a disk evaluation apparatus having an optical system with NA=0.85. The CNR was measured. The linear velocity at that time was 5.0 m/s. After recording was performed using a laser beam modulated at a frequency of 17 MHz, a modulated beam at 4.6 MHz was overwritten. These operations were alternately repeated 10 times. The 4.6-MHz signal finally recorded was reproduced, and the CNR was measured. An excellent CNR of 57 dB was obtained, as shown in FIG. 5.

Next, a multilevel recording experiment was conducted using the medium. The write power was set to binary values of 4 mW and 6 mW. The erase power was set to 1.8 mW. The medium was irradiated with a recording pulse sequence while modulating the power stairwise. The reproduced waveform was observed with an oscilloscope. A reproduction signal voltage corresponding to each level was measured. The reproduction level of a portion irradiated with the power of 6 mW was defined as 1, and the reproduction level at a portion irradiated with the erase level power was defined as 0. The reproduction level at a portion irradiated with the power of 4 mW was 0.56. A staircase waveform that was the same as the recording waveform was reproduced. That is, multilevel recording is possible. For multilevel recording, the beam power was modulated to binary values. Instead of modulating the power level, a laser power at a portion corresponding to a recording mark may be divided into multiple pulses, and their duty ratio may be changed for multilevel modulation. Alternatively, multilevel modulation may be executed by combining the beam power and the duty ratio of multiple pulses.

To examine the reason why the excellent result was obtained with the medium of the present invention, the characteristics of film materials used were evaluated. Three single-layered films on the opposite side of the light incident side when viewed from the recording film side, which were made of transparent film materials, i.e., $ZnS:SiO_2$ and $BaF_2$, were formed. Their optical constants and thermal conductivities were evaluated.

The thermal conductivity measurement procedure is as follows. Each single-layered film was formed to a thickness of 10 μm on a 30-μm thick glass plate and measured by a measuring apparatus using an optical AC method. The optical constant measurement procedure is as follows. Each single-layered film was formed to a thickness of 50 nm on an Si wafer and measured by ellipsometry. FIG. 6 shows the results. As compared to $ZnS/SiO_2$ of the first transparent film 163, $BaF_2$ of the second transparent film 162 had a low refractive index but a high thermal conductivity. Especially, the thermal conductivity of the second transparent film 162 was 10 times or more of that of the first transparent film 163. As a result of ellipsometry, k<<0.06 for the transparent films 161, 162, and 163. When the measurement accuracy was taken into consideration, the optical constant was substantially 0.

Example 2 of the optical information recording medium of the present invention will be described next.

FIG. 7 is a table showing the film structure of the two-layered phase change optical recording medium shown in FIGS. 1 and 2. The evaluation of the medium having the layer structure shown in FIG. 7 will be described. As shown in FIG. 7, Rc>Ra, i.e., the medium had a so-called High-to-Low polarity. The manufacturing procedure was the same as in Example 1 except that some films were made of different materials. For the reflectance of the medium, preferably, Rc is as low as possible, and ΔR=|Ra−Rc| is as high as possible. However, when Rc is excessively decreased, the reproduction signal intensity of a header prepit degrades. In addition, tracking becomes unstable. For these reasons, the reflectance Rc was intentionally made relatively high, 5.5%. In this case, ΔR was as high as 9.5%.

This medium was evaluated in accordance with the same procedure as in Example 1. The reproduction signal CNR at 4.6 MHz was 50 dB. When the linear velocity was increased to 8 m/s, and recording was performed as the same frequency, the reproduction signal CNR was 57 dB. That is, this medium is suitable for a high linear velocity. Only when tracking and header signals can be stably read, Rc can be designed to be lower. With this design, the noise level can be reduced.

When the thermal conductivities and optical constants of the transparent films in this medium were measured, the results shown in FIG. 8 were obtained. Measurements were done in accordance with the same procedure as in FIG. 1. The second transparent film 162 had a smaller optical constant than those of the first transparent film 163 and third transparent film 161. However, the second transparent film 162 had a higher thermal conductivity than those of the first transparent film 163 and third transparent film 161. These facts are the same as in Example 1. However, the thermal conductivity of the second transparent film 162 was about twice that of the first transparent film 163 or third transparent film 161. For this reason, at a low linear velocity of 5.0 m/s, this medium can ensure no sufficient recording film cooling rate. At a higher linear velocity, however, since the speed at which a heated portion goes away from a beam is high, the cooling rate increases. Hence, it is supposed that the medium is suitable for a high linear velocity.

A result of comparison between the optical information recording medium of the present invention and a conventional optical information recording medium (to be referred to as a control medium hereinafter) will be described next.

FIG. 9 is a table showing the layer structure of the control medium. As shown in FIG. 9, Rc>Ra for the control medium. Since a 5-nm thick Ag alloy film was used for the control medium, Ra could be reduced to 1.6%. However, since the transmittance was designed to be 50%, the absolute value of the reflectance difference was only 6.7%, i.e., smaller than that of the medium of the present invention.

The recording/reproduction characteristic of the control medium was evaluated in accordance with the same procedure as in Example 1. For the control medium, a second information layer was formed in advance. After that, a thin photo-setting resin film having grooves was formed. In addition, a film related to the first information layer was stacked.

The control medium was evaluated using a disk evaluation apparatus having an optical system with NA=0.85. The linear velocity was set to 5.0 m/s. After recording was performed using a laser beam modulated at a frequency of 17 MHz, a modulated beam at 4.6 MHz was overwritten. These operations were alternately repeated 10 times. The 4.6-MHz signal finally recorded was reproduced. The CNR was measured. It was only 48 dB. Since the difference in cooling rate might be reflected, measurements were done again while changing the linear velocity. However, the CNR was 53 dB even at an optimum linear velocity of 8 m/s. The signal intensities were compared. Although the carrier level in Example 1 was −9.0 dBm, it was only −13 dBm in the control medium. Reproduction signal waveform observation with an oscilloscope revealed that the signal amplitude was small. It was probably because the reflectance difference was small. A multilevel recording experiment was conducted by modulating the recording power to binary values. Since waveform observation with the oscilloscope showed that the amplitude was not sufficiently large, the waveforms at the binary values could not be appropriately separated.

The present invention is not limited to the above-described structures. For example, three or more dielectric films may be formed on the opposite side of the light incident side with respect to the recording film. A very thin metal film may be added without departing from the spirit and scope of the present invention that the transmittance of the first information layer is made as high as possible. In this case as well, the effect of the present invention can be obtained as compared to a case wherein the two or more dielectric films are not present. As the materials of transparent films, in addition to the combinations of $ZnS:SiO_2$, $MgF_2$, and $SiO_2$ described above, $TiO_2$, AlN, SiN, $Ta_2O_5$, $CeO_2$, $ZrO_2$, $HfO_2$, or the like can be used as the high-index material of the first and third transparent films. As the low-index material of the second transparent film, $CaF_2$, $SrF_2$, $Al_2O_3$, $MgO_2$, $Y_2O_3$, $MgF_2$, $CeF_3$, $YF_3$, $AlF_3$, or the like can be used. When the thermal conductivity is taken into consideration, a material with a low refractive index and high thermal conductivity, e.g., $MgF_2$ or $CaF_2$ is optimum.

According to the embodiment of the present invention, since a necessary transmittance can be ensured for the first information layer of a single-sided, two-layered rewritable phase change medium, and a reproduction signal with a high reproduction signal intensity and low noise can be obtained, an optical recording medium suitable for a high density can be provided.

The thicknesses of the first transparent film (first dielectric film) 163, second transparent film (second dielectric film) 162, and third transparent film (third dielectric film) 161 will be described. The optimum thickness of the first transparent film 163 was examined by optical simulations. When the first transparent film 163 having a thickness smaller than 10 nm was irradiated with a light beam having a wavelength of 400 nm, the effect is small. In addition, the thickness of the second transparent film 162 was preferably larger than 10 nm. That is, when the first transparent film 163 was irradiated with a light beam having a wavelength λ, the thickness was preferably λ/40 nm or more. Similarly, the thickness of the second transparent film 162 was also preferably λ/40 nm or more.

For example, assume that the preferable thickness of the first transparent film 163 is 10 nm. Let n1 be the real part of the refractive index of the first transparent film 163. Even when the thickness of the first transparent film 163 is 10+mλ/2n1 (m is an arbitrary natural number), an appropriate refractive index can be obtained. In this way, many preferable thicknesses can be set in terms of optical characteristic. However, if the films are too thick, light is absorbed by the first transparent film 163 and second transparent film 162, resulting in adverse influence on the optical characteristic of the recording medium. As a result, no large reflectance difference between the crystal state and the amorphous state can be obtained. Additionally, a long time is required to form such a thick film, resulting in a disadvantage in manufacturing the medium. To ensure the effect of the interface film 164, its thickness must be 1 nm or more. When these conditions are taken into consideration, a distance d1 from the boundary between the recording film 165 and the interface film 164 to the boundary between the second transparent film 162 and the third transparent film 161 must be (λ/20+1) nm or more. The upper limit of d1 is about 2λ. The function of the interface film may be imparted to the first transparent film 163. In this case, the lower limit of d1 is λ/20 nm. That is, the distance d1 is set within the range of λ/20<d1<2λ (λ: the wavelength of the light beam).

The refractive indices of the first transparent film 163, second transparent film 162, and third transparent film 161 will be described. Let n1 be the real part of the complex index of the first transparent film 163, n2 be the real part of the complex index of the second transparent film 162, and n3 be the real part of the complex index of the first transparent film 163. As already described above, n1<n2 and n3>n2. Especially, when n1/n2>1.4 or n3/n2>1.4, an excellent effect can be obtained, as can be seen from optical calculations.

Figure 11:
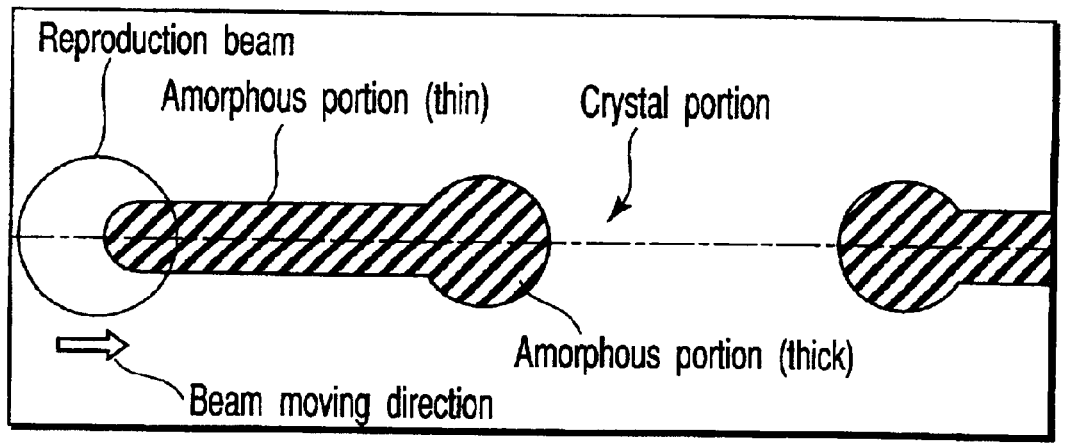
FIG. 11 is a view schematically showing a multilevel recording mark on the optical information recording medium of the present invention.
Figure 12:
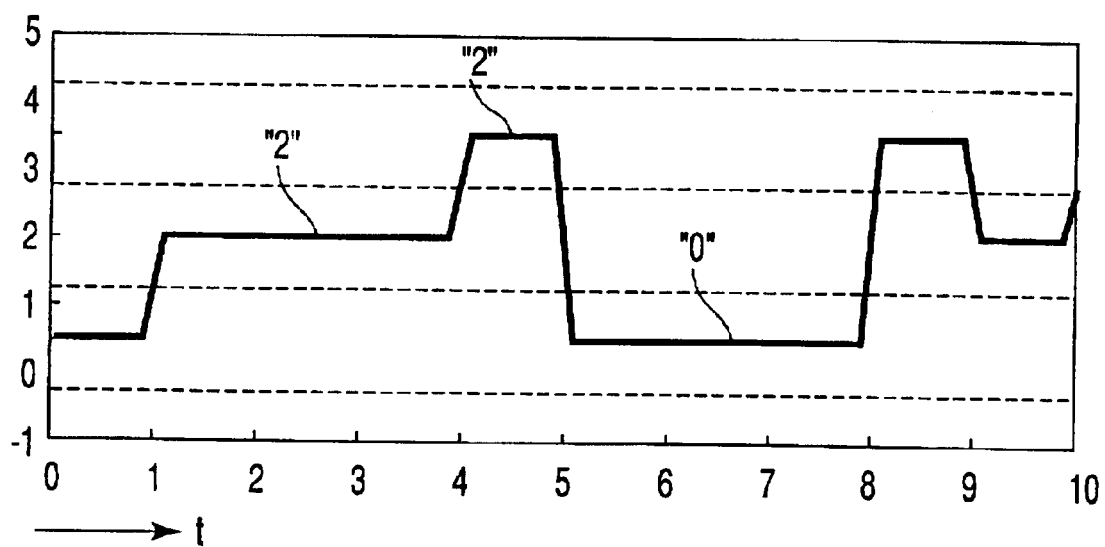
FIG. 12 is a graph showing a reproduction signal obtained by reproducing a multilevel recording mark recorded on the optical information recording medium of the present invention.

Multilevel recording will be described next with reference to FIGS. 10 to 12. FIG. 10 is a graph showing a change-over-time in recording beam power in recording multilevel information on the optical information recording medium according to the embodiment of the present invention. FIG. 11 is a view schematically showing a multilevel recording mark on the optical information recording medium of the present invention. FIG. 12 is a graph showing a reproduction signal obtained by reproducing a multilevel recording mark recorded on the optical information recording medium according to the embodiment of the present invention.

Portions corresponding to ternary values "0", "1", and "2" in the reproduction waveform shown in FIG. 12 correspond to a crystal portion, thin amorphous mark, and thick amorphous mark shown in FIG. 11, respectively. This is merely an example. The values "0", "1", and "2" can freely correspond to the crystal portion, thin amorphous mark, and thick amorphous mark. With this arrangement, the recording density can be increased to 3/2 times that of a conventional medium which can record only binary values "1" and "0" in regions with a single track width. The crystal portion corresponding to "0" can be formed by irradiation at a continuous power Pe of erase level independently of the state before recording. The thin amorphous portion corresponding to "1" can be formed by irradiation at an intermediate power level P1. The thick amorphous portion corresponding to "2" can be formed by light irradiation at a highest power level P2. If a mark having a single width must be formed across a relatively long region, the recording beam is preferably divided into pulses to execute so-called multi-pulse irradiation. This prevents any change in mark width by re-crystallization of a molten portion. In this case, a power level Pb lower than the Pe is used in a period sandwiched by the individual pulses. With this operation, an amorphous mark string with a uniform width can be stably formed. Multilevel recording by modulating the pulse power at the time of recording to a plurality of values has been described. Multilevel recording may be executed by modulating the pulse width and duty ratio. To reproduce a multilevel recording mark string, slice levels are set between levels 0 and 1, between levels 1 and 2, and between levels 2 and 3 of the reproduction waveform shown in FIG. 12. The type of data is discriminated by comparison with the slice levels, thereby dividing the recording mark into multilevel data.

The schematic arrangement of an optical disk drive according to another embodiment of the present invention will be described next with reference to FIG. 13. This optical disk device records target data on the above-described optical information recording medium (optical disk 1) as multilevel data or reproduces multilevel data recorded on the optical disk 1.

Figure 13:
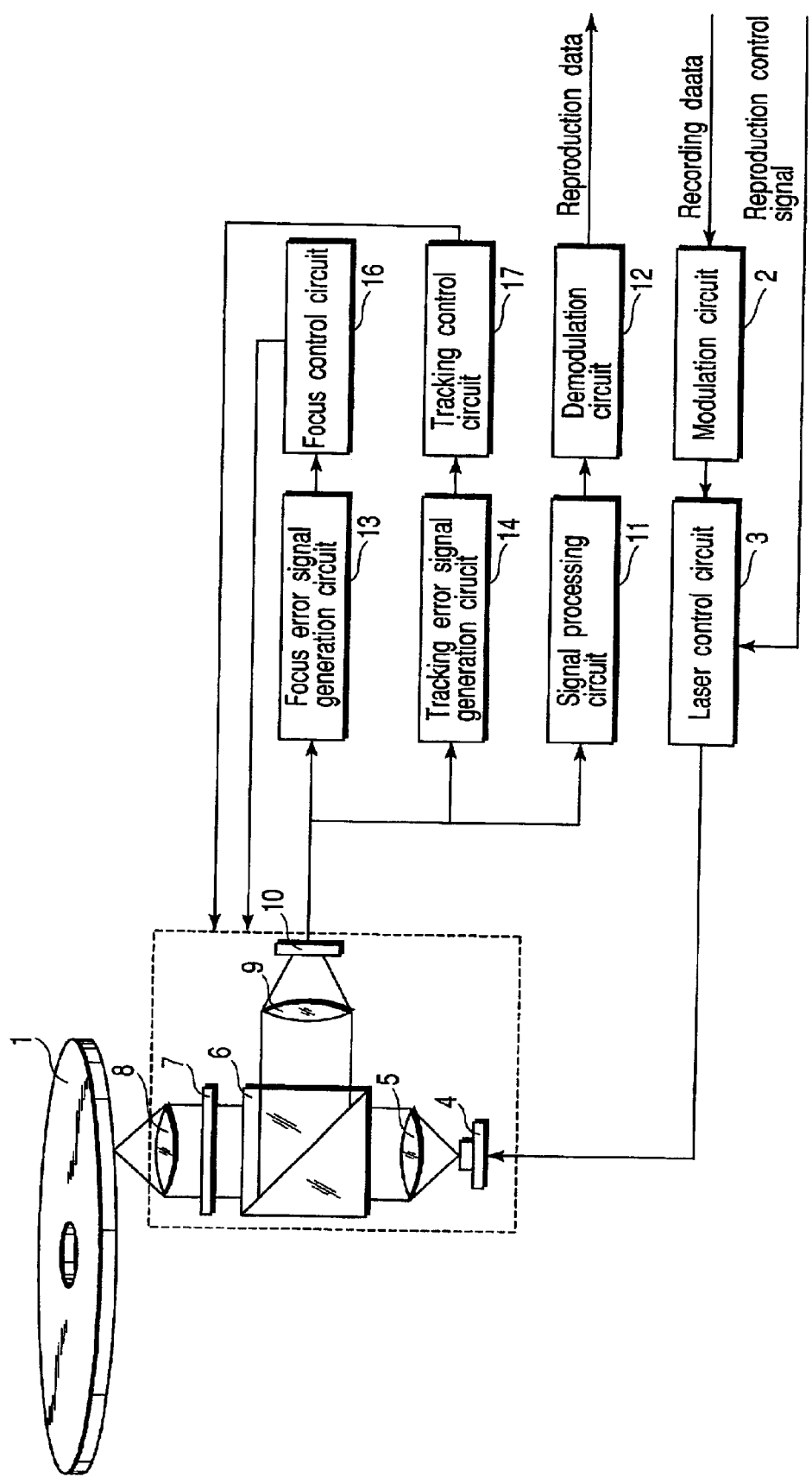
FIG. 13 is a schematic view of an optical disk drive according to another embodiment of the present invention.

As shown in FIG. 13, the optical disk device comprises a modulation circuit 2, laser control circuit 3, laser 4, collimator lens 5, polarized beam splitter (to be referred to as a PBS hereinafter) 6, λ/4-wavelength plate 7, objective lens 8, condenser lens 9, photodetector 10, signal processing circuit 11, demodulation circuit 12, focus error signal generation circuit 13, tracking error signal generation circuit 14, focus control circuit 16, and tracking control circuit 17.

Multilevel data recording by the optical disk device will be described. Recording data is modulated by the modulation circuit 2 and converted into a laser driving waveform by the laser control circuit 3. The laser control circuit 3 drives the laser 4 at a predetermined timing or predetermined power to record target data on the optical disk 1 as multilevel data. A recording light beam emitted from the laser 4 is collimated into a parallel light beam by the collimator lens 5 and enters and passes through the PBS 6. The beam transmitted through the PBS 6 passes through the λ/4-wavelength plate 7 and is focused on the information recording surface of the optical disk 1 through the objective lens 8. The focused beam is maintained in a state capable of obtaining the best fine spot on the recording surface under focus control by the focus control circuit 16 and tracking control by the tracking control circuit 17.

Reproduction of multilevel recorded data by the optical disk device will be described next. On the basis of a data reproduction instruction, the laser 4 emits a light beam for reproduction. The reproduction light beam emitted for the laser 4 is collimated into a parallel light beam by the collimator lens 5 and enters and passes through the PBS 6. The beam transmitted through the PBS 6 passes through the λ/4-wavelength plate 7 and is focused on the information recording surface of the optical disk 1 through the objective lens 8. The focused beam is maintained in a state capable of obtaining the best fine spot on the recording surface under focus control by the focus control circuit 16 and tracking control by the tracking control circuit 17. At this time, the reproduction light beam with which the optical disk 1 is irradiated is reflected in the information recording surface. The reflected light beam is transmitted through the objective lens 8 in the reverse direction and converted into a parallel light beam again. The reflected light beam passes through the λ/4-wavelength plate 7. The light beam is polarized vertically with respect to incident light and is reflected by the PBS 6. The beam reflected by the PBS 6 is converged by the condenser lens 9 and enters the photodetector 10. The photodetector 10 is formed from, e.g., a 4-division photodetector. The light beam incident on the photodetector 10 is photoelectrically converted into an electrical signal and amplified. The amplified signal is processed by the signal processing circuit 11 and sent to the demodulation circuit 12. The demodulation circuit 12 performs demodulation corresponding to a predetermined modulation scheme, so the reproduced data is output.

On the basis of some components of the electrical signal output from the photodetector 10, the focus error signal generation circuit 13 generates a focus error signal. Similarly, on the basis of some components of the electrical signal output from the photodetector 10, the tracking error signal generation circuit 14 generates a tracking error signal. The focus control circuit 16 controls focus of the beam spot on the basis of the focus error signal. The tracking control circuit 17 controls tracking of the beam spot on the basis of the tracking error signal.

As has been described above, the optical information recording medium according to the present invention can cope with a low level in either a High-to-Low or Low-to-High arrangement. In addition, the optical information recording medium of the present invention can realize multilevel recording on a single-sided, two-layered medium and enables recording at a much higher density.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording medium capable of recording/reproducing information upon being irradiated with a light beam, comprising:
    a substrate;
    a light incident surface;
    a first information recording layer formed between said substrate and said light incident surface to transit between a crystal state and an amorphous state upon being irradiated with the light beam; and
    a second information recording layer formed between said substrate and said first information recording layer to transit between the crystal state and the amorphous state upon being irradiated with the light beam,
    wherein said first information recording layer comprises sequentially from a side of said light incident surface to a side of said substrate,
    a recording film,
    a first dielectric film whose complex index has a real part n1,
    a second dielectric film whose complex index has a real part n2, and
    a third dielectric film whose complex index has a real part n3, and
    relationships n1>n2 and n3>n2 are satisfied.

2. A medium according to claim 1, wherein
    said medium comprises an interface film between said recording film and said first dielectric film, and
    a distance d from a boundary between said recording film and said interface film to a boundary between said second dielectric film and said third dielectric film is set within a range of $\lambda/20<d<2\lambda$ ($\lambda$: a wavelength of the light beam).

3. A medium according to claim 1, wherein a relationship n1/n2>1.4 is satisfied.

4. A medium according to claim 1, wherein a relationship n3/n2>1.4 is satisfied.

5. A medium according to claim 1, wherein letting a1 be a thermal conductivity of said first dielectric film and a2 be a thermal conductivity of said second dielectric film, a relationship a1<10*a2 is satisfied.

6. An optical disk drive for irradiating an optical information recording medium with a light beam to record/reproduce information, comprising:
    irradiation section configured to irradiating said optical information recording medium with the light beam; and
    recording section configured to controlling at least one of an irradiation timing and irradiation power of the light beam by said irradiation section to record multilevel information,
    wherein said optical information recording medium comprises
    a substrate,
    a light incident surface,
    a first information recording layer formed between said substrate and said light incident surface to transit between a crystal state and an amorphous state upon being irradiated with the light beam, and
    a second information recording layer formed between said substrate and said first information recording layer to transit between the crystal state and the amorphous state upon being irradiated with the light beam,
    said first information recording layer comprises sequentially from a side of said light incident surface to a side of said substrate,
    a recording film,
    a first dielectric film whose complex index has a real part n1,
    a second dielectric film whose complex index has a real part n2, and
    a third dielectric film whose complex index has a real part n3, and
    relationships n1>n2 and n3>n2 are satisfied.

* * * * *